United States Patent [19]
Padovan

[11] 3,727,762
[45] Apr. 17, 1973

[54] FILTER PRESS FOR CONTINUOUS FILTRATION UNDER PRESSURE

[76] Inventor: Giuseppe Padovan, Via Fenzi 39, Conegliano, Italy

[22] Filed: Aug. 30, 1971

[21] Appl. No.: 176,072

[30] Foreign Application Priority Data

Sept. 10, 1970 Italy...............................41617 A/70

[52] U.S. Cl. .................210/136, 210/142, 210/329, 210/332, 210/345
[51] Int. Cl. ....B01d 35/12, B01d 29/38, B01d 29/02
[58] Field of Search.....................210/136, 142, 329, 210/332, 345

[56] References Cited

UNITED STATES PATENTS 2,771,999   11/1956   Boyer................................210/329

Primary Examiner—Frank A. Spear, Jr.
Attorney—Guido Modiano et al.

[57] ABSTRACT

A filter press operating under pressure including a vessel (1) filled with crude material with compressed fluid lying above. A hollow shaft projects into the vessel and supports an assembly of filter elements immersed in the crude material. At least one drying and removing unit for the filter cake is mounted in the vessel above the crude material, into which the filter elements are brought in succession. Driving means are provided for imparting a stepwise movement to the filter elements to the filter assembly and a raising and lowering movement to the individual filter elements with respect to the drying and removing unit.

10 Claims, 4 Drawing Figures

INVENTOR
GIUSEPPE PADOVAN

FILTER PRESS FOR CONTINUOUS FILTRATION UNDER PRESSURE

BACKGROUND OF THE INVENTION

The present invention relates to a filter press, or more precisely to a filter in which the filtering elements consist of filter plates into which the filtered liquid penetrates whereas the filter cake adheres to their external wall. Filters of this type conventionally allow the liquid, dry cake or both to be recovered, according to whether the filtrate, solid or both are required. However all filter presses presently available give rise to disadvantages. Either they are constructionally complex, give slow filtration or are of discontinuous operation so as to allow cleaning of the elements and recovery of the solid. Moreover they require the presence of personnel for continuous supervision and consequently are costly both as regards capital and operational cost.

SUMMARY OF THE INVENTION

An object of the present invention is to obviate the aforementioned disadvantages by providing a completely automatic filter press which is of continuous operation and high efficiency. The filter press according to the invention comprises a vessel of vertical axis filled with crude material to a predetermined level, a hollow shaft projecting into the vessel from below and rotable about the vertical axis of the vessel, said hollow shaft constituting a support for a radial pack of filter elements immersed in the crude material to be filtered and a manifold for the filtrate penetrating inside the elements, at least one unit mounted in the vessel above the raw material for drying the filter cake and removing it from the outside of the elements, and synchronized driving means for imparting a stepwise forward movement to the radial pack and a raising and lowering movement to the individual filter elements with respect to the drying and removing unit in the intervals during which the radial pack is still.

BRIEF DESCRIPTIONS OF THE DRAWINGS

Further characteristics and advantages of the invention will be more evident from the description of an embodiment which follows with reference by way of example to the accompanying drawings in which.

In the various figures the same reference numerals have been used for indicating corresponding parts.

Figure 1:
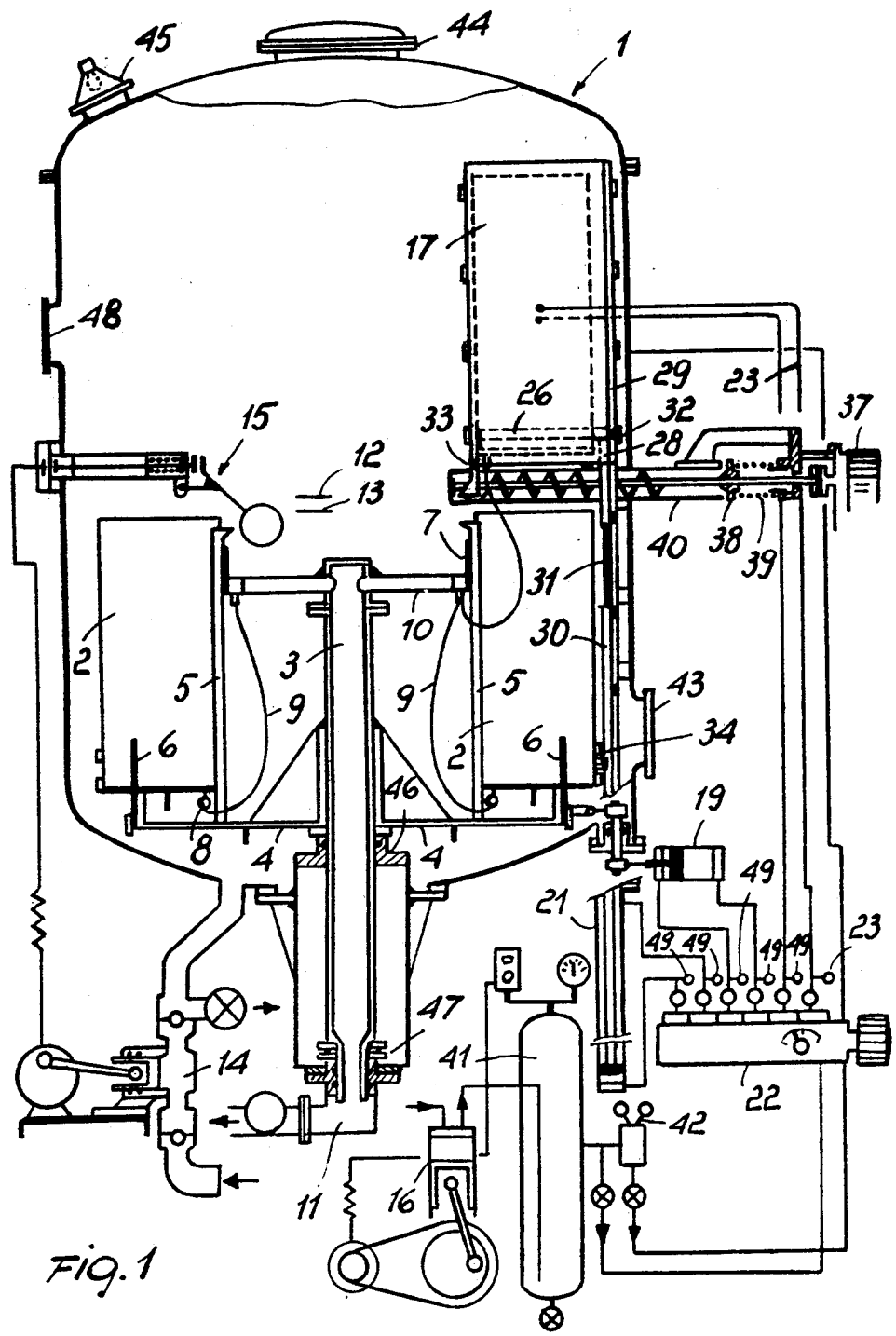
FIG. 1 is a diagrammatic sectional assembled view of one embodiment of the filter according to the invention.

The filter shown comprises a large tightly closed vessel 1 of vertical axis in which is mounted a radial pack of bag type filter elements 2 disposed radially about a hollow shaft 3 and resting on a supporting disc 4 rigid with the shaft 3. Guides 5 and 6 of limited height maintain the elements 2 vertical, and raisable with respect to the supporting disc 4. The guides 5 are connected by way of a fixed retaining plate 7 to a manifold 10 which communicates by way of flexible tubes 9 with the interior of each element 2 through a drain 8 fitted with a spring closed cock automatically operated, as will be explained hereinafter. The manifold 10 also communicates with the interior of the hollow shaft 3 in order to carry the filtrate to the outlet 11. Consequently the shaft 3 operates both as a support for the radial pack of filter elements 2 and as a manifold for the filtrate. The filter elements 2 may be of any conventional type so long as they are in the form of a rectangular frame on which are fixed two porous walls forming a bag into which the liquid (filtrate) penetrates whereas the solid (filter cake) is deposited on the walls. An intermittent rotation is imparted to the supporting disc 4 and hence to the radial pack of filter elements, in the form of incremental movements each equal to the distance 20 between two adjacent elements 2, by means of a pneumatic piston driving system 19. The vessel 1 is filled with crude material, or more precisely the solution to be filtered in order to separate the liquid from the solid, to a fixed level lying between the limiting values 12 and 13. The radial pack of filter elements 2 is completely immersed in the crude material. The crude material is fed by a pump 14 controlled by an electric level controller 15. Above the vessel there is a chamber containing gas under pressure, such as air or other inert gas, supplied by a compressor 16.

The gas pressure acting on the crude material considerably increases the filtration capacity of the apparatus. Obviously the pump 14 operates at a pressure greater than that of the gas in order to allow crude material to enter the vessel 1. Above the radial pack of filter elements 2, in the vessel 1, a pneumatically controlled unit is mounted for drying by mechanical squeezing action the filter cake deposited on the walls of a filter element raised into said unit, and for making the dry or nearly dry filter cake fall by means of a scraper blade. In particular said unit comprises two plates 17 with their opposing faces provided with membranes 18 which are flat when the respective plate 17 communicates with a drain 23, as shown in FIG. 1, and are thrust outwards with reciprocal approach when the plate 17 is put into communication with compressed gas, which may be the same gas which feeds the upper chamber of the vessel 1 but compressed to a greater pressure. Consequently when the membranes 18 are in the flat condition they define a space in which the filter element lying below is carried, and when they are thrust outwards, with the element 2 interposed, they press against the walls of the element 2, so drying the filter cake on the walls of the element by squeezing action. The element 2 is raised by a slide 28 movable on guides 29, 33 and 34 under the action of a piston 30 slideable in a cylinder 21. It should be noted that each element 2 is consequently always maintained in the required vertical disposition by the effect of guides 5 and 6 when in the lowered position and by the effect of guides 29 and 33 when raised between the plates 17. A central pneumatic unit 22 with cyclic programmer operates in sequence to the drive 19 which moves the radial pack forward stepwise and the drive 21 which raises and lowers the slide 28, in addition to serving the membranes 18. It should be noted that when an element 2 is raised so as to leave the crude material, the cock on its drain 8 closes automatically so as to avoid outflow of gas from the vessel 1, then when the membranes 18 begin to press on the element and tightly adhere to its walls, they overcome the force of the spring so opening the drain cock, by which the liquid squeezed out flows to the manifold 10. When the membrane 18 is removed the spring closes the cock of the drain 8 which remains closed until the element 2 is once again completely immersed in the crude material. In order to remove the dry cake from the filter element, a pair of scraper blades 24 is provided pivoted in a fixed position at 27 and a pair of scaper blades 25 pivoted at 26 on the slide 28. Pivots 31 and 32 complete with two lever cams (not shown) serve to switch the pairs of blades from an inactive position during the rising stroke of the filter element and a working condition during the descending stroke of the element during which the blades 24 scape the walls of the element so removing the dry filter cake, whereas the blades 25 scrape the membrane so removing any solid material which may be adhering to it. The solid material or filter cake thus removed falls into a conveyor 40 with two parallel screws 36 driven by motor reduction units 37. For each screw, a plug 38 thrust by an adjustable spring 39 pushes against the extremity of the conveyor duct 40 so as to form a compact plug of filter cake which closes said duct and avoids loss of compressed gas present at the summit of the vessel 1. If the cake is formed of a granular material incapable of forming said plug, the seal at the extremity of the conveyor duct 40 is obtained by means of a gas tight chamber (not shown) for collecting the cake, which may be provided with two exit doors opening pneumatically and synchronized so as to open the discharge from this supplementary chamber only when the discharges or conveyors 40 are shut. The apparatus is completed by a cylinder 41, a pressure reducer 42 for feeding gas to the vessel 1 at a pressure less than that of the gas controlling the membranes 18 and feeding the controls 19 and 21, manholes 43 and 44, lamps 45 for internal vessel illumination, stuffing boxes 46 and 47 for the tight assembly of the hollow shaft 3, a sight glass 48 and compressed air discharge outlets 49. Instead of a single membrane unit 18 as shown, two or more could be used so increasing the capacity of the apparatus.

Figure 4:
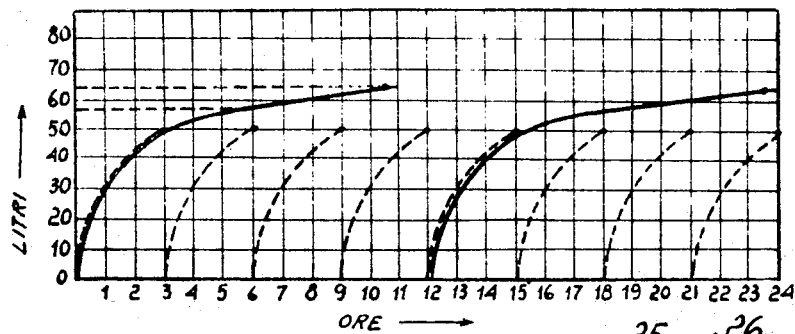
FIG. 4 is a diagram showing the efficiency of the filter according to the invention with respect to a conventional filter press.
Figure 3:
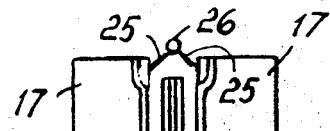
FIG. 3 is a further view of the detail of FIGS. 1 and 2.
Figure 2:
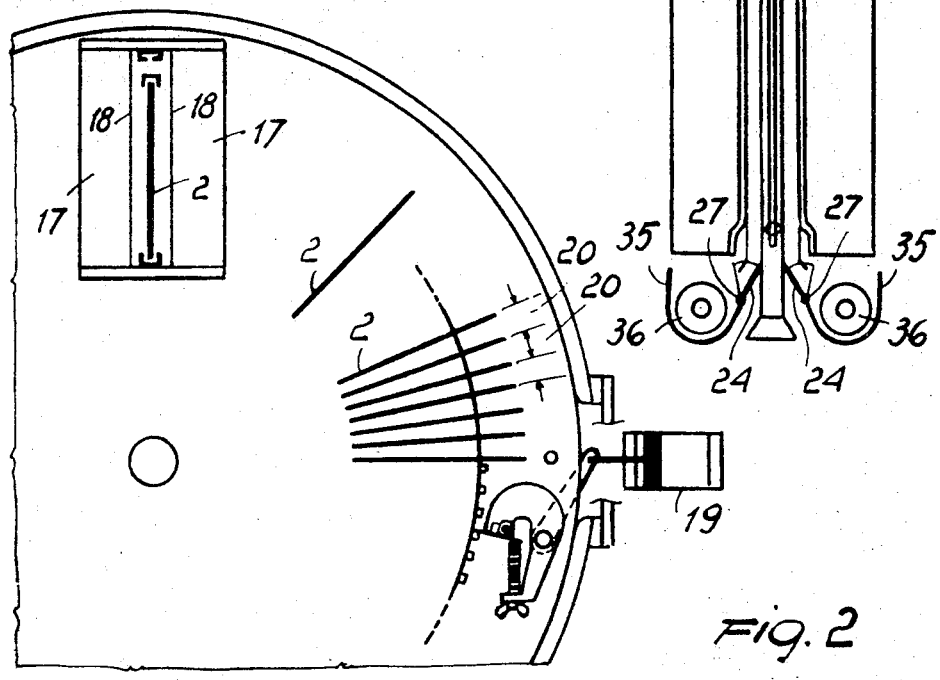
FIG. 2 is a plan view of a detail of FIG. 1.

In the diagram shown in FIG. 4, the full line represents the capacity of a conventional filter press whose filtration capacity increases with time and with the rest period for drying and removing the filter cake, whereas the broken lines shown the capacity of the filter according to the present invention, in which periods of slow filtration (when the filter elements are partly blocked by the cake) and stoppage for cleaning filter elements and recovery of the filter cake are eliminated.

Operation of the filter as heretofore described is as follows:

With the vessel 1 filled with crude material to the predetermined level, the radial pack carries out an intermittent rotation by the action of the drive 19 with stepwise forward movement equal to the distance between two filter elements, because of which by the effect of movement of the filter in the crude material and the pressure applied by the gas on the crude material, there is good filtration with discharge of the filtrate through the hollow shaft 3 whereas the solid material is deposited in the form of a filter cake on the walls of the elements. At each stoppage of the radial pack, the element lying below the space between the membranes 18 is raised and the filter cake is dried and removed in the manner heretofore described. As soon as the element cleaned in this way has been replaced in its position in the radial pack, a further movement is imparted to the radial pack so bringing the element immediately succeeding that just cleaned under the membrane unit 18 so as to clean it and recover the dry filter cake, and so on.

Within the principle of the invention, the constructional details and embodiments may be widely varied with respect to that described and illustrated without leaving the field of the inventive concept.

I claim:

1. A filter press operating under pressure, of the type formed of a vessel of vertical axis filled with crude material to a predetermined level with compressed gas lying above and in which a hollow shaft of vertical axis projects into the vessel and supports a radial pack of filter elements of the bag type completely immersed in the crude material, comprising at least one drying and removing unit for the filter cake mounted in the vessel above the level of the crude material, onto which the filter elements are brought in succession, with membrane means for squeezing and pressing the filter cake on the element, and synchronized driving means for imparting a stepwise forward movement to the radial pack and a raising and lowering movement to the individual filter elements with respect to the drying and removing unit during the intervals of time in which the radial pack is still.

2. A filter as claimed in claim 1 comprising a central pneumatic unit with cyclic programmer for controlling in a synchronized manner the intermittent rotation of the radial pack, the raising and lowering of the individual elements and the thrust on the membranes, and for providing other supplies of compressed gas as may be required.

3. A filter as claimed in claim 1, wherein the drying and removing unit comprises a pair of membranes thrust pneumatically against the interposed element in order to dry by the mechanical action of squeezing or pressing.

4. A filter as claimed in claim 3, wherein the membranes constitute the opposing spaced faces of a pair of plates whose interior is in communication with a discharge from the compressed gas and is put into communication with compressed gas when an element is interposed between them in order to thrust the membranes against the element.

5. A filter as claimed in claim 1, wherein the membranes constitue the covering of the opposing faces of two plates which are reciprocally approachable in order to squeeze an interposed filter element by mechanical action.

6. A filter as claimed in claim 1, wherein each element is provided with a discharge communicating with the hollow shaft, said discharge being provided with a cock which is open when the element is in the crude material or between the membranes pressing on it, whereas it is closed during the raising and lowering strokes in order to avoid outflow of gas from the vessel.

7. A filter as claimed in claim 1, further comprising a pair of blades pivoted at fixed points and acting on the walls of the element and a pair of blades pivoted at points mobile with the element and acting on the membranes, said blades being driven automatically in the inactive condition during the rising stroke of an element and in the working or scraping condition during a descending stroke.

8. A filter as claimed in claim 7, wherein the scraper blades thrust the dry filter cake against a conveyor with two parallel screws.

9. A filter as claimed in claim 8, wherein the conveyor is sealed in order to avoid losses from the vessel.

10. A filter as claimed in claim 1, further comprising a cyclic programmer with adjustable times of filtration and squeezing - drying and wherein guides are provided of limited height for each element and guides at each drying - removing unit for the filter element being raised.

* * * * *